United States Patent
White et al.

(10) Patent No.: US 11,672,054 B2
(45) Date of Patent: Jun. 6, 2023

(54) CIRCUITRY FOR AN INDUCTION ELEMENT FOR AN AEROSOL GENERATING DEVICE

(71) Applicant: NICOVENTURES TRADING LIMITED, London (GB)

(72) Inventors: Julian White, Cambridge (GB); Martin Horrod, Cambridge (GB)

(73) Assignee: Nicoventures Trading Limited, London (GB)

(*) Notice: Subject to any disclaimer, the term of this patent is extended or adjusted under 35 U.S.C. 154(b) by 342 days.

(21) Appl. No.: 15/733,298

(22) PCT Filed: Dec. 20, 2018

(86) PCT No.: PCT/EP2018/086138
§ 371 (c)(1),
(2) Date: Jun. 22, 2020

(87) PCT Pub. No.: WO2019/122094
PCT Pub. Date: Jun. 27, 2019

(65) Prior Publication Data
US 2021/0093008 A1    Apr. 1, 2021

(30) Foreign Application Priority Data
Dec. 21, 2017    (GB) ..................... 1721610

(51) Int. Cl.
*H05B 6/10*    (2006.01)
*A24F 40/465*    (2020.01)
(Continued)

(52) U.S. Cl.
CPC ........... *H05B 6/105* (2013.01); *A24F 40/465* (2020.01); *H02M 3/33571* (2021.05);
(Continued)

(58) Field of Classification Search
CPC ......... H05B 6/105; H05B 6/02; A24F 40/465; A24F 47/00; H02M 3/33571
See application file for complete search history.

(56) References Cited

U.S. PATENT DOCUMENTS 5,613,505 A * 3/1997 Campbell ............... A24F 40/53
131/194
9,060,388 B2    6/2015 Liu
(Continued)

FOREIGN PATENT DOCUMENTS

CA    3002585 A1    4/2017
CN    104095291 A    10/2014
(Continued)

OTHER PUBLICATIONS

English translation of CN206251000, Xu, Peng, Inverter Circuit Based on HPWM Modulation, 2017, 5 pages.
(Continued)

*Primary Examiner* — Kyle J Moody
(74) *Attorney, Agent, or Firm* — Patterson Thuente, P.A.

(57) ABSTRACT

Circuitry for an induction element for an aerosol generating device. The induction element is for inductive heating of a susceptor for heating an aerosol generating material in use. The circuitry includes a driver arrangement arranged to provide, from an input direct current, an alternating current for driving the induction element in use. The driver arrangement includes a plurality of transistors arranged in a H-bridge configuration. The H-bridge configuration includes a high side pair of transistors and a low side pair of transistors, the high side pair being for connection to a first electric potential higher than a second electric potential to which the low side pair is for connection is use. At least one of the high side pair of transistors is a p-channel field effect transistor.

26 Claims, 3 Drawing Sheets

(51) Int. Cl.
    *H05B 1/02*     (2006.01)
    *H05B 6/06*     (2006.01)
    *H02M 3/335*     (2006.01)
    *A24F 40/57*     (2020.01)

(52) U.S. Cl.
    CPC ............ *H05B 1/0227* (2013.01); *H05B 6/06* (2013.01); *H05B 6/108* (2013.01); *A24F 40/57* (2020.01)

(56) References Cited

U.S. PATENT DOCUMENTS

| | | | |
|---|---|---|---|
| 10,028,533 B2 * | 7/2018 | Fursa | H05B 6/36 |
| 10,028,535 B2 * | 7/2018 | Mironov | A24F 40/465 |
| 10,524,508 B2 * | 1/2020 | Sur | A24F 40/90 |
| 10,582,726 B2 * | 3/2020 | Sur | H05B 1/0227 |
| 11,164,694 B2 * | 11/2021 | Kumar | H02M 3/158 |
| 2016/0227840 A1 | 8/2016 | Xiang | |
| 2019/0029078 A1 | 1/2019 | Steele et al. | |
| 2020/0022412 A1 * | 1/2020 | Abi Aoun | A24F 40/50 |
| 2020/0037402 A1 * | 1/2020 | Abi Aoun | H05B 6/06 |
| 2020/0237018 A1 * | 7/2020 | Sur | H05B 6/105 |
| 2021/0029786 A1 * | 1/2021 | Lee | H05B 6/06 |
| 2021/0093012 A1 * | 4/2021 | White | A24F 40/465 |
| 2021/0169146 A1 * | 6/2021 | Korus | A24F 40/10 |
| 2021/0186109 A1 * | 6/2021 | Milligan | A24F 40/53 |
| 2022/0039472 A1 * | 2/2022 | White | A24F 40/465 |
| 2022/0160045 A1 * | 5/2022 | Horrod | H05B 6/108 |
| 2022/0225680 A1 * | 7/2022 | Lopez | H05K 1/0207 |
| 2022/0225685 A1 | 7/2022 | Blackmon et al. | |

FOREIGN PATENT DOCUMENTS

| | | | |
|---|---|---|---|
| CN | 203952405 U | | 11/2014 |
| CN | 203969194 U | | 12/2014 |
| CN | 204411440 U | | 6/2015 |
| CN | 204888733 U | | 12/2015 |
| CN | 206251000 U | | 6/2017 |
| CN | 107039980 A | | 8/2017 |
| CN | 108991603 A | | 12/2018 |
| CN | 110476477 A | | 11/2019 |
| KR | 100385395 B1 | | 8/2003 |
| KR | 20150143891 A | | 12/2015 |
| KR | 102424249 B1 | | 7/2022 |
| WO | 9527411 A1 | | 10/1995 |
| WO | WO2016169446 | * | 4/2016 |
| WO | 2017068098 A1 | | 4/2017 |
| WO | 2017068100 A1 | | 4/2017 |
| WO | 2017205692 A1 | | 11/2017 |

OTHER PUBLICATIONS

Office action for Canadian Application No. 3121581, dated Oct. 21, 2022, 3 pages.
Office action for Canadian Application No. 3121583, dated Oct. 14, 2022, 4 pages.
Office Action for Korean Application No. 10-2020-7017740, dated Feb. 8, 2022, 14 pages.
Office Action for Korean Application No. 10-2020-7017746, dated Aug. 18, 2022, 13 pages.
Office Action for Korean Application No. 10-2020-7017746, dated Feb. 10, 2022, 25 pages.

* cited by examiner

CIRCUITRY FOR AN INDUCTION ELEMENT FOR AN AEROSOL GENERATING DEVICE

PRIORITY CLAIM

The present application is a National Phase entry of PCT Application No. PCT/EP2018/086138, filed Dec. 20, 2018, which claims priority from GB Patent Application No. 1721610.2, filed Dec. 21, 2017, each of which is hereby fully incorporated herein by reference.

TECHNICAL FIELD

The present disclosure relates to circuitry for an induction element for an aerosol generating device, and more specifically to circuitry for an induction element for an aerosol generating device, the induction element being for inductive heating of a susceptor for heating an aerosol generating material in use.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

According to a first aspect of the present disclosure, there is provided circuitry for an induction element for an aerosol generating device, the induction element being for inductive heating of a susceptor for heating an aerosol generating material in use, the circuitry comprising: a driver arrangement arranged to provide, from an input direct current, an alternating current for driving the induction element in use; wherein the driver arrangement comprises a plurality of transistors arranged in a H-bridge configuration; wherein the H-bridge configuration comprises a high side pair of transistors and a low side pair of transistors, the high side pair being for connection to a first electric potential higher than a second electric potential to which the low side pair is for connection is use; wherein at least one of the high side pair of transistors is a p-channel field effect transistor.

Optionally, both of the high side pair of transistors are p-channel field effect transistors.

Optionally, one or both of the low side pair of transistors are transistors other than p-channel field effect transistors.

Optionally, one or both of the low side pair of transistors are n-channel field effect transistors.

Optionally, the driver arrangement is arranged for connection of a DC power source in use across a first point between the high side pair of transistors and a second point between the low side pair of transistors.

Optionally, the driver arrangement is arranged for connection of the induction element in use across a third point between one of the high side pair of transistors and one of the low side pair of transistors and a fourth point between the other of the high side pair of transistors and the other of low side second pair of transistors.

Optionally, the or each p-channel field effect transistor is controllable by a switching potential to substantially allow current to pass therethrough in use.

Optionally, the driving arrangement comprises a driver controller arranged to control supply of the switching potential to the or each p-channel field effect transistor in use.

Optionally, the switching potential by which the p-channel field effect transistor is controllable in use is between the first potential and the second potential.

Optionally, the or each p-channel field effect transistor is arranged such that, when the switching potential is provided to the p-channel field effect transistor then the p-channel field effect transistor substantially allows current to pass therethrough, and when the switching potential is not provided to the p-channel field effect transistor then the p-channel field effect transistor substantially prevents current from passing therethrough.

Optionally, the or each p-channel field effect transistor comprises a source, a drain, and a gate, and wherein in use the switching potential is provided to the gate of the or each p-channel field effect transistor.

Optionally, the or each p-channel field effect transistor is a p-channel metal-oxide-semiconductor field effect transistor.

Optionally, a first transistor of the high side pair is a p-channel field effect transistor, and a second transistor of the low side pair is an n-channel field effect transistor, the second transistor being electrically adjacent to the first transistor.

Optionally, the driver arrangement comprises a first supply connection arranged to supply a or the switching potential in common to both of the first transistor and the second transistor.

Optionally, the driver arrangement comprises a first half-bridge device comprising: the first transistor; the second transistor; and a first body in which the first and second transistors are provided.

Optionally, a third transistor of the high side pair is a p-channel filed effect transistor and a fourth transistor of the low side pair is an n-channel field effect transistor, the fourth transistor being electrically adjacent to the third transistor.

Optionally, the driver arrangement comprises a second supply connection arranged to supply a or the switching potential in common to both of the third transistor and the fourth transistor.

Optionally, the circuitry comprises a or the driver controller, the driver controller being arranged to control supply of the switching potential alternately to the first supply connection and the second supply connection, thereby to provide the alternating current in use.

Optionally, the driver arrangement comprises a second half-bridge device comprising: the third transistor; the fourth transistor; and a second body in which the third and fourth transistors are provided.

Optionally, the driver arrangement is arranged for connection to a or the DC power source to provide the input direct current in use.

Optionally, the driver arrangement is configured for connection to the DC power source to provide the switching potential in use.

According to a second aspect of the present disclosure, there is provided an aerosol generating device comprising: the circuitry according to the first aspect.

Optionally, the aerosol generating device further comprises: a or the DC power source, the DC power source being arranged to provide the input direct current in use and/or the or a switching potential in use.

Optionally, the aerosol generating device further comprises: the induction element; and the driver arrangement is arranged to provide alternating current to the induction element in use.

Optionally, the aerosol generating device comprises an LC circuit comprising the induction element, to which LC circuit the alternating current is provided in use.

Optionally, the aerosol generating device further comprises: the susceptor; and the susceptor is arranged to be inductively heated by the induction element in use.

Optionally, the device further comprises: the aerosol generating material; and the aerosol generating material is arranged to be heated by the susceptor in use thereby to generate an aerosol in use.

Optionally, the aerosol generating material is or comprises tobacco.

DETAILED DESCRIPTION

Figure 1:
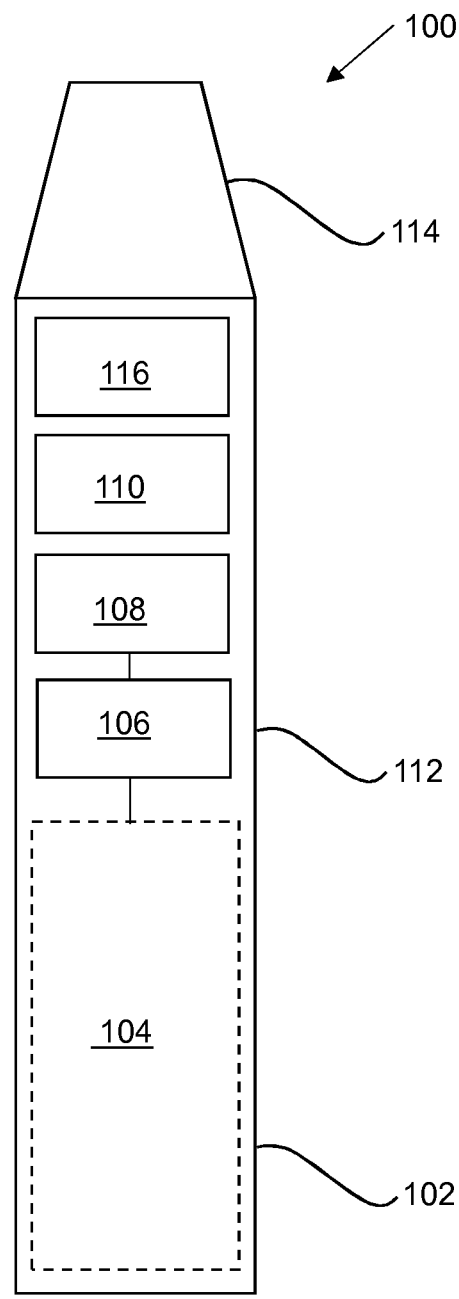
FIG. 1 illustrates schematically an aerosol generating device according to an example.

Induction heating is a process of heating an electrically conducting object (or susceptor) by electromagnetic induction. An induction heater may comprise an induction element, such as an electromagnet, and circuitry for passing a varying electric current, such as an alternating electric current, through the electromagnet. The varying electric current in the electromagnet produces a varying magnetic field. The varying magnetic field penetrates a susceptor suitably positioned with respect to the electromagnet, generating eddy currents inside the susceptor. The susceptor has electrical resistance to the eddy currents, and hence the flow of the eddy currents against this resistance causes the susceptor to be heated by Joule heating. In cases whether the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

An induction heater may comprise an RLC circuit, comprising a resistance (R) provided by a resistor, an inductance (L) provided by an induction element, for example the electromagnet which may be arranged to inductively heat a susceptor, and a capacitance (C) provided by a capacitor, connected in series. In some cases, resistance is provided by the ohmic resistance of parts of the circuit connecting the inductor and the capacitor, and hence the RLC circuit need not necessarily include a resistor as such. Such a circuit may be referred to, for example as an LC circuit. Such circuits may exhibit electrical resonance, which occurs at a particular resonant frequency when the imaginary parts of impedances or admittances of circuit elements cancel each other. Resonance occurs in an RLC or LC circuit because the collapsing magnetic field of the inductor generates an electric current in its windings that charges the capacitor, while the discharging capacitor provides an electric current that builds the magnetic field in the inductor. When the circuit is driven at the resonant frequency, the series impedance of the inductor and the capacitor is at a minimum, and circuit current is maximum. Driving the RLC or LC circuit at or near the resonant frequency may therefore provide for effective and/or efficient inductive heating.

A transistor is a semiconductor device for switching electronic signals. A transistor typically comprises at least three terminals for connection to an electronic circuit.

A field effect transistor (FET) is a transistor in which the effect of an applied electric field may be used to vary the effective conductance of the transistor. The field effect transistor may comprise a body B, a source terminal S, a drain terminal D, and a gate terminal G. The field effect transistor comprises an active channel comprising a semiconductor through which charge carriers, electrons or holes, may flow between the source S and the drain D. The conductivity of the channel, i.e. the conductivity between the drain D and the source S terminals, is a function of the potential difference between the gate G and source S terminals, for example generated by a potential applied to the gate terminal G. In enhancement mode FETs, the FET may be off (i.e. substantially prevent current from passing therethrough) when there is substantially zero gate G to source S voltage, and may be turned on (i.e. substantially allow current to pass therethrough) when there is a substantially non-zero gate G-source voltage.

An n-channel (or n-type) field effect transistor (n-FET) is a field effect transistor whose channel comprises a n-type semiconductor, where electrons are the majority carriers and holes are the minority carriers. For example, n-type semiconductors may comprise an intrinsic semiconductor (such as silicon for example) doped with donor impurities (such as phosphorus for example). In n-channel FETs, the drain terminal D is placed at a higher potential than the source terminal S (i.e. there is a positive drain-source voltage, or in other words a negative source-drain voltage). In order to turn an n-channel FET "on" (i.e. to allow current to pass therethrough), a switching potential is applied to the gate terminal G that is higher than the potential at the source terminal S.

A p-channel (or p-type) field effect transistor (p-FET) is a field effect transistor whose channel comprises a p-type semiconductor, where holes are the majority carriers and electrons are the minority carriers. For example, p-type semiconductors may comprise an intrinsic semiconductor (such as silicon for example) doped with acceptor impurities (such as boron for example). In p-channel FETs, the source terminal S is placed at a higher potential than the drain terminal D (i.e. there is a negative drain-source voltage, or in other words a positive source-drain voltage). In order to turn a p-channel FET "on" (i.e. to allow current to pass therethrough), a switching potential is applied to the gate terminal G that is lower than the potential at the source terminal S (and which may for example be higher than the potential at the drain terminal D).

A metal-oxide-semiconductor field effect transistor (MOSFET) is a field effect transistor whose gate terminal G is electrically insulated from the semiconductor channel by an insulating layer. In some examples, the gate terminal G may be metal, and the insulating layer may be an oxide (such as silicon dioxide for example), hence "metal-oxide-semiconductor". However, in other examples, the gate may be from other materials than metal, such as polysilicon, and/or the insulating layer may be from other materials than oxide, such as other dielectric materials. Such devices are nonetheless typically referred to as metal-oxide-semiconductor field effect transistors (MOSFETs), and it is to be understood that as used herein the term metal-oxide-semiconductor field effect transistors or MOSFETs is to be interpreted as including such devices.

A MOSFET may be an n-channel (or n-type) MOSFET where the semiconductor is n-type. The n-channel MOSFET (n-MOSFET) may be operated in the same way as described above for the n-channel FET. As another example, a MOSFET may be a p-channel (or p-type) MOSFET, where the semiconductor is p-type. The p-channel MOSFET (p-MOSFET) may be operated in the same way as described above for the p-channel FET. An n-MOSFET typically has a lower source-drain resistance than that of a p-MOSFET. Hence in an "on" state (i.e. where current is passing therethrough), n-MOSFETs generate less heat as compared to p-MOSFETs, and hence may waste less energy in operation than p-MOSFETs. Further, n-MOSFETs typically have shorter switching times (i.e. a characteristic response time from changing the switching potential provided to the gate terminal G to the MOSFET changing whether or not current passes therethrough) as compared to p-MOSFETs. This can allow for higher switching rates and improved switching control.

FIG. 1 illustrates schematically a device 100, according to an example. The device 100 is an aerosol generating device 100. The aerosol generating device 100 comprises a DC power source 104, in this example a battery 104, circuitry 106, an induction element 108, a susceptor 110, and aerosol generating material 116. The DC power source 104 is electrically connected to the circuitry 106. The DC power source is 104 is arranged to provide DC electrical power to the circuitry 106. The circuitry 106 is electrically connected to the induction element 108. The induction element 108 may be, for example, an electromagnet, for example a coil or solenoid, which may for example be planar, which may for example be formed from copper. The circuitry 106 is arranged to convert an input DC current from the DC power source 104 into a varying, for example alternating, current. The circuitry 106 is arranged to drive the alternating current through the induction element 108.

The susceptor 110 is arranged relative to the induction element 108 for inductive energy transfer from the induction element 108 to the susceptor 110. The susceptor may comprise a ferromagnetic portion, which may comprise one or a combination of example metals such as iron, nickel and cobalt. The induction element 108, having alternating current driven therethrough, causes the susceptor 110 to heat up by Joule heating and/or by magnetic hysteresis heating, as described above. The susceptor 110 is arranged to heat the aerosol generating material 116, for example by conduction, convection, and/or radiation heating, to generate an aerosol in use. In some examples, the susceptor 110 and the aerosol generating material 116 form an integral unit that may be inserted and/or removed from the aerosol generating device 100, and may be disposable. In some examples, the induction element 108 may be removable from the device 100, for example for replacement. The aerosol generating device 100 may be hand-held. The aerosol generating device 100 may be arranged to heat the aerosol generating material 116 to generate aerosol for inhalation by a user.

It is noted that, as used herein, the term "aerosol generating material" includes materials that provide volatilized components upon heating, typically in the form of vapor or an aerosol. Aerosol generating material may be a non-tobacco-containing material or a tobacco-containing material. For example, the aerosol generating material may be or comprise tobacco. Aerosol generating material may, for example, include one or more of tobacco per se, tobacco derivatives, expanded tobacco, reconstituted tobacco, tobacco extract, homogenized tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol or propylene glycol.

Returning to FIG. 1, the aerosol generating device 100 comprises an outer body 112 housing the battery 104, the control circuitry 106, the induction element 108, the susceptor 110, and the aerosol generating material 116. The outer body 112 comprises a mouthpiece 114 to allow aerosol generated in use to exit the device 100.

In use, a user may activate, for example via a button (not shown) or a puff detector (not shown) which is known per se, the circuitry 106 to cause alternating current to be driven through the induction element 108, thereby inductively heating the susceptor 116, which in turn heats the aerosol generating material 116, and causes the aerosol generating material 116 thereby to generate an aerosol. The aerosol is generated into air drawn into the device 100 from an air inlet (not shown), and is thereby carried to the mouthpiece 114, where the aerosol exits the device 100.

The circuitry 106, induction element 108, susceptor 110 and/or the device 100 as a whole may be arranged to heat the aerosol generating material 116 to a range of temperatures to volatilize at least one component of the aerosol generating material without combusting the aerosol generating material 116. For example, the temperature range may be about 50° C. to about 350° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some examples, the temperature range is between about 170° C. and about 220° C. In some examples, the temperature range may be other than this range, and the upper limit of the temperature range may be greater than 300° C.

Figure 2:
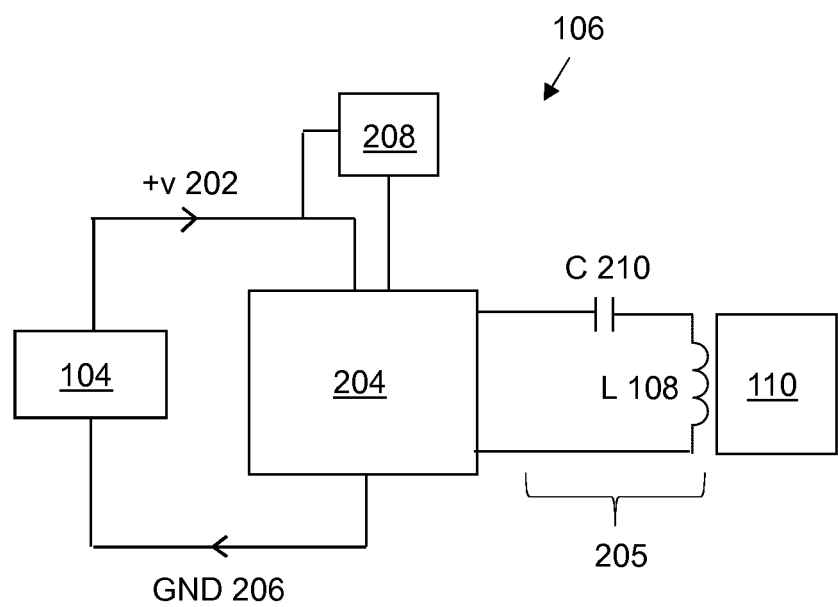
FIG. 2 illustrates schematically circuitry for use with an induction element for an aerosol generating device, according to an example.

Referring now to FIG. 2, there is illustrated schematically in more detail the circuitry 106 for the induction element 108 for the aerosol generating device 100, according to an example.

The circuitry 106 comprises a driver arrangement 204. The driver arrangement 204 is electrically connected to the battery 104. Specifically, the driver arrangement 204 is connected to a positive terminal of the battery 104, that provides relatively high electric potential +v 202, and to a negative terminal of the battery or to ground, which provides a relatively low or no or negative electric potential GND 206. A voltage is therefore established across the driver arrangement 204.

The driver arrangement 204 is electrically connected to an LC circuit 205 comprising the induction element 108 having inductance L, and a capacitor 210 having capacitance C, connected in series.

The driver arrangement 106 is arranged to provide, from an input direct current from the battery 104, an alternating current to the LC circuit 205 for driving the induction element 108 in use. The driver arrangement 204 is electrically connected to a driver controller 208, for example comprising logic circuitry. The driver controller 208 is arranged to control the driver arrangement 204, or components thereof, to provide the output alternating current from the input direct current. Specifically, as described in more detail below, the driver controller 208 may be arranged to control the provision of a switching potential to transistors of the driver arrangement 204 at varying times to cause the driver arrangement 204 to produce the alternating current. The driver controller 208 is electrically connected to the battery 104, from which the switching potential may be derived. For example, the switching potential may be the same as the potential +v 202 provided by the positive terminal of the battery 104, for example relative to the negative terminal of the battery or GND 206 (or vice versa, as explained in more detail below). The DC power source or battery 104 may to provide the input direct current in use and may also provide the switching potential in use.

The driver controller 208 may be arranged to control the frequency of alternating current provided to the LC circuit 205 and hence to frequency of the alternating current driven through the induction element 108. As mentioned above, LC circuits may exhibit resonance. The driver controller 208 may control the frequency of the alternating current driven through the LC circuit (the drive frequency) to be at or near the resonant frequency of the LC circuit 205. For example, the drive frequency may be in the MHz range, for example in the range 0.5 to 1.5 MHz for example 1 MHz. It will be appreciated that other frequencies may be used, for example depending on the particular LC circuit 205 (and/or components thereof), and/or susceptor 110 used. For example, it will be appreciated that the resonant frequency of the LC circuit 205 may be dependent on the inductance L and capacitance C of the circuit 205, which in turn may be dependent on the inductor 108, capacitor 210 and susceptor 110 used.

Figure 3A:
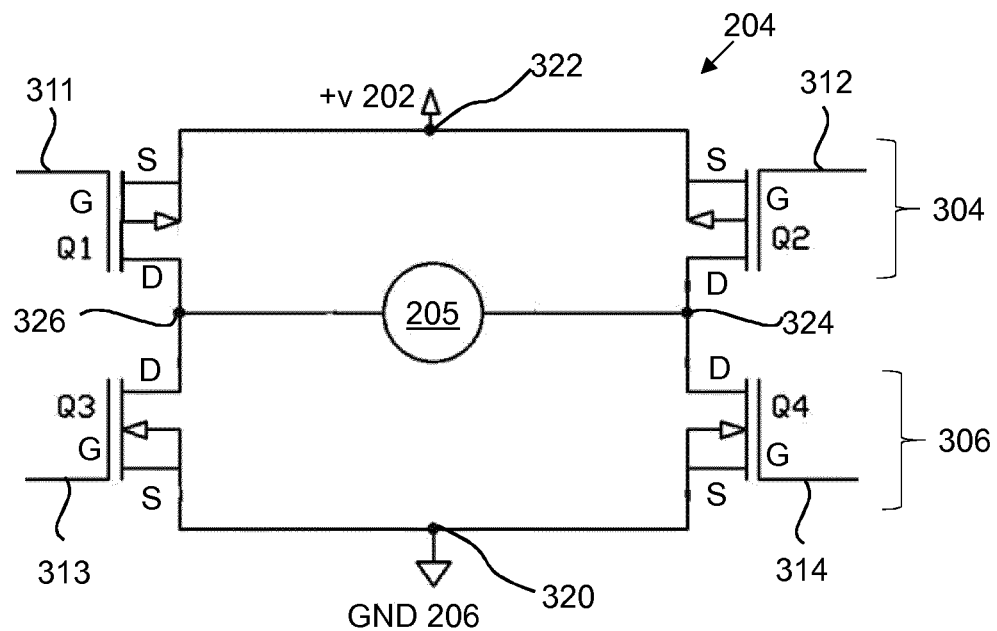
FIG. 3a illustrates a portion of circuitry for use with an induction element for an aerosol generating device, according to a first example.

In use, when the driver controller 208 is activated, for example by a user, the driver controller 208 may control the driver arrangement 204 to drive alternating current through the LC circuit 205 and hence through the induction element 108, thereby inductively heating the susceptor 116 (which then may heat an aerosol generating material (not shown in FIG. 2) to produce an aerosol for inhalation by a user, for example).

Referring now to FIG. 3, there is illustrated schematically in more detail a driver arrangement 204, according to a first example. The driver arrangement 204 comprises a plurality of transistors, in this example four transistors Q1, Q2, Q3, Q4, arranged in a H-bridge configuration (note that transistors arranged or connected in a H-bridge configuration may be referred to as a H-bridge). The H-bridge configuration comprises a high side pair 304 of transistors Q1, Q2 and a low side pair 306 of transistors Q3, Q4. A first transistor Q1 of the high side pair 304 is electrically adjacent to a third transistor Q3 of the low side pair 306, and a second transistor Q2 of the high side pair 304 is electrically adjacent to a fourth transistor of the low side pair 314. The high side pair 304 are for connection to a first electric potential +v 202 higher than a second electric potential GND 206 to which the low side pair 306 are for connection. In this example, the driver arrangement 204 is arranged for connection of the DC power source 104 (not shown in FIG. 3*a*) across a first point 322 between the high side pair 304 of transistors Q1, Q2 and a second point 320 between the low side pair 306 of transistors Q3, Q4. Specifically, the first point 322 is for connection to a positive terminal of the battery (not shown) and the second point 320 is for connection to a negative terminal of the battery (not shown) or ground. In use therefore, a potential difference is established between the first point 322 and the second point 320.

As with FIG. 2, the driver arrangement 204 illustrated in FIG. 3 is electrically connected to, and arranged to drive, the LC circuit 208 comprising the induction element (not shown in FIG. 3). Specifically, the induction element (as part of the LC circuit 208) is connected across a third point 324 between one of the high side pair of transistors Q2 and one of the low side pair of transistors Q4 and a fourth point 326 between the other of the high side pair of transistors Q1 and the other of low side second pair of transistors Q3.

Each field effect transistor Q1, Q2, Q3, Q4 is controllable by a switching potential to substantially allow current to pass therethrough in use. Each field effect transistor Q1, Q2, Q3, Q4 comprises a source S, a drain D, and a gate G. The switching potential is provided to the gate of each field effect transistor, which as described above may allow current to pass between the source S and the drain D of each field effect transistor Q1, Q2, Q3 Q4. Accordingly, each field effect transistor Q1, Q2, Q3, Q4 is arranged such that, when the switching potential is provided to the field effect transistor Q1, Q2, Q3, Q4 then the field effect transistor Q1, Q2, Q3, Q4, substantially allows current to pass therethrough, and when the switching potential is not provided to the field effect transistor Q1, Q2, Q3, Q4, then the field effect transistor Q1, Q2, Q3, Q4 substantially prevents current from passing therethrough. In the example illustrated in FIG. 3*a*, each field effect transistor Q1, Q2, Q3, Q4 has an associated switching voltage line 311, 312, 313, 314 (respectively) for carrying the switching voltage thereto.

The driver controller (not shown in FIG. 3*a*, but see the driver controller 208 in FIG. 2) is arranged to control supply of the switching potential to each field effect transistor. Specifically, in this example, the driver controller is arranged to control the supply of the switching potential to each supply line 311, 312, 313, 314 independently, thereby to independently control whether each respective transistor Q1, Q2, Q3, Q4 is in an "on" mode (i.e. low resistance mode where current passes therethrough) or an "off" mode (i.e. high resistance mode where substantially no current passes therethrough).

By controlling the timing of the provision of the switching potential to the respective field effect transistors Q1, Q2, Q3, Q4, the driver controller 208 may cause alternating current to be provided to the LC circuit 205, and hence for alternating current to be provided to the induction element (not shown in FIG. 3*a*) thereof. For example, at a first time, the driver controller 208 may be in a first switching state, where a switching potential is provided to the first and the fourth field effect transistors Q1, Q4, but not provided to the second and the third field effect transistors Q2, Q3. Hence the first and fourth field effect transistors Q1, Q4 will be in a low resistance mode, whereas second and third field effect transistors Q2, Q3 will be in a high resistance mode. Therefore, at this first time, current will flow from the first point 322 of the driver arrangement 204, through the first field effect transistor Q1, through the LC circuit 205 in a first direction (left to right in the sense of FIG. 3*a*), through the fourth field effect transistor Q4 to the second point 320 of the driver arrangement 204. However, at a second time, the driver controller 208 may be in a second switching state, where a switching potential is provided to the second and third field effect transistors Q2, Q3, but not provided to the first and the fourth field effect transistors Q1, Q4. Hence the second and third field effect transistors Q2, Q3 will be in a low resistance mode, whereas first and fourth field effect transistors Q1, Q4 will be in a high resistance mode. Therefore, at this second time, current will flow from the first point 322 of the driver arrangement 204, through the second field effect transistor Q2, through the LC circuit 205 in a second direction opposite to the first direction (i.e. right to left in the sense of FIG. 3a), through the third field effect transistor Q3 to the second point 320 of the driver arrangement 204. By alternating between the first and second switching state therefore, the driver controller 208 may control the driver arrangement 204 to provide (i.e. drive) alternating current through the LC circuit 205 and hence through the induction element 108.

At least one of the high side pair of transistors Q1, Q2 is a p-channel field effect transistor, for example an enhancement mode p-channel metal-oxide-semiconductor field effect transistor. Specifically, in this example, both of the high side pair of transistors Q1, Q2 are p-channel field effect transistors. One or both of the low side pair of transistors Q3, Q4 are transistors other than p-channel field effect transistors. Specifically, in this example, both of the low side pair of transistors Q3, Q4 are n-channel field effect transistors, for example enhancement mode n-channel metal-oxide-semiconductor field effect transistors.

As also described above, for n-channel FETs, the drain terminal D is placed at a higher potential than the source terminal S (i.e. there is a positive drain-source voltage, or in other words a negative source-drain voltage), and in order to turn the n-channel FET "on" (i.e. to allow current to pass therethrough), the switching potential applied to the gate terminal G needs to be is higher than the potential at the source terminal S. In a hypothetical example where the high side pair of transistors Q1, Q2 are n-channel filed effect transistors, at certain times the potential experienced at the source terminal S of those transistors would be +v 202. Therefore, in this hypothetical example, the switching potential needed to be provided to the gates of these transistors in order to turn them on would need to be higher than +v 202, (i.e. higher than the potential provided by the positive terminal of the DC power source 104). This hypothetical example may therefore require a separate DC power source (e.g. in addition to the battery 104) to operate the high side n-channel field effect transistors, which may complicate and increase cost of the circuit.

However, as mentioned above, for p-channel FETs, the source terminal S is placed at a higher potential than the drain terminal D (i.e. there is a negative drain-source voltage, or in other words a positive source-drain voltage), and in order to turn a p-channel FET "on" (i.e. to allow current to pass therethrough), a switching potential is applied to the gate terminal G that is lower than the potential at the source terminal S. The inventors have appreciated that if the high side pair of transistors Q1, Q2 are p-channel field effect transistors (as per the example of FIG. 3a), the switching potential provided to the gates G of these transistors in order to turn them on need not be higher than +v 202, and for example can be GND 206. In this case there is no need to provide a potential higher than +v 202, and hence for example no need to provide a DC power source separate to the battery 104, and hence the complexity and the cost of the circuitry 106 can therefore be reduced.

As mentioned above, the switching potential by which the high-side pair of p-channel field effect transistors Q1, Q2 are controllable in use may be between +v 202 and GND 206. For example, when a potential of +v 202 is provided to the gate terminal of the p-channel field effect transistors Q1, Q2, then the transistors may be in an off state where substantially no current passes therethrough, and when a potential of between less than +v 202 and GND 206, for example GND 206, is applied to the gate terminal of the p-channel field effect transistors Q1, Q2, then the transistor Q1, Q2 substantially allows current to pass therethrough. The low side pair 306 of field effect transistors are n-channel field effect transistors Q3, Q4 whose drain terminal D is placed at a higher potential than the source terminal S. The source terminal S of these transistors therefore experience GND 206, and hence in order to turn these transistors on, the switching potential applied to the gate terminal G need only be higher than GND 206, for example +v 202. For example, when a potential of GND 206 is provided to the gate terminal of the n-channel field effect transistors Q3, Q4, then the transistors may be in an off state where substantially no current passes therethrough, and when a potential of between higher than GND 206 and +v 202, for example +v 202, is applied to the gate terminal of the n-channel field effect transistors Q3, Q4, then the transistor Q3, Q4 substantially allow current to pass therethrough. Therefore, providing the low side pair 306 of transistors Q3, Q4 as n-channel field effect transistors and providing the high side pair 304 of transistors as p-channel field effect transistors Q1, Q2 allows for the driver arrangement 204 to be controlled by switching potentials in the range +v 202 to GND 206, i.e. in the range of potentials provided by the battery 104 arranged to provide the input DC current to the driving arrangement 204. Therefore, only one DC power source (e.g. battery 104) need be provided to provide both the functions of providing the input current for the driving arrangement 204 and providing the switching potentials for controlling the driving arrangement 204. Therefore, the complexity and hence cost of the circuit can be reduced.

The field effect transistors Q1, Q2, Q3, Q4 may be, for example, metal-oxide-semiconductor field effect transistors. For example, the high side pair 304 of transistors Q1, Q2 may be p-channel metal-oxide-semiconductor field effect transistors, or the like, and the low side pair 206 of transistors Q3, Q4 may be n-channel metal-oxide-semiconductor field effect transistors, or the like.

Figure 3B:
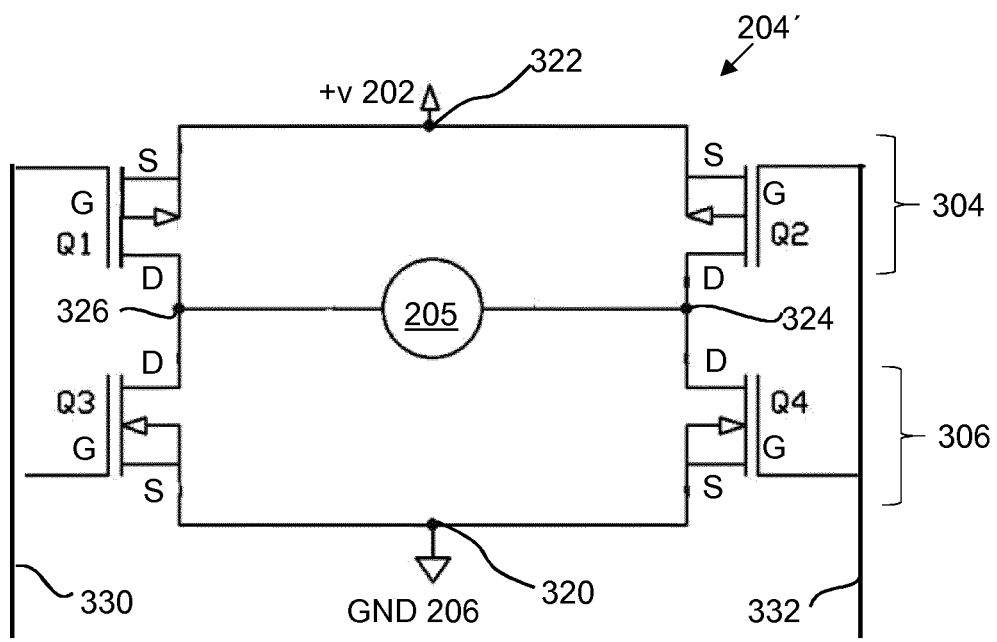
FIG. 3b illustrates a portion of circuitry for use with an induction element for an aerosol generating device, according to a second example.

Referring now to FIG. 3b, there is illustrated schematically a driver arrangement 204', according to a second example. The driver arrangement 204' according to this second example may be used in place of the driver arrangement 204 of the circuitry 106 of FIG. 2, for example. The driver arrangement 204' of this second example illustrated in FIG. 3b is substantially the same as the driver arrangement 204 of the first example illustrated in FIG. 3a, except that in this second example driver arrangement 204', there is a first common switching potential supply line 330 in place of the separate switching potential supply lines 311, 313 supplying the first and third transistors Q1, Q3 of the first example driver arrangement 204, and there is a second common switching potential supply line 332 in place of the separate switching potential supply lines 312, 314 supplying the second and fourth transistors Q2, Q4 of the first example driver arrangement 204. Other components of the second example driver arrangement 204' are the same as those of the first example driver arrangement 204 and so are given like reference numerals and will not be described in detail again.

As mentioned above, the driver arrangement 204' comprises a first supply line or connection 330 arranged to supply a switching potential in common to both of the first transistor Q1 (being a first p-channel field effect transistor of a high side pair 304 of transistors) and the third transistor Q3 (being a first n-channel field effect transistor of the low side pair 306 of transistors) of the driver arrangement 204', and a second supply line or connection 322 arranged to supply a switching potential in common to both of the second transistor Q2 (being a second p-channel field effect transistor of the high side pair 304 of transistors) and the fourth transistor Q4 (being a second n-channel field effect transistor of the low side pair 306 of transistors). The first and third transistors Q1, Q3 may be referred to as a first half-bridge of the H-bridge configuration, and the second and fourth Q2, Q4 may be referred to as a second half-bridge of the H-bridge configuration.

In this example, the driver controller (not shown in FIG. 3b, but see e.g. driver controller 208 of FIG. 2) is arranged to control supply of a switching potential alternately to the first supply connection 330 and the second supply connection 332, thereby to control the provision of alternating current by the driver arrangement 204' to the LC circuit 205 comprising the induction element (not shown in FIG. 3b) in use.

For example, at a first time, the driver controller 208 may be in a first switching state, where a potential of GND 206 is provided to the first supply connection 330, and a potential of +v 202 is provided to the second supply connection 332. Therefore, the gate terminals of the first and third transistors Q1, Q3 will have a potential of GND 206 applied thereto, and the gate terminals of the second and fourth transistors Q2, Q4 will have a potential of +v 202 applied thereto. Therefore, the first transistor Q1 (being a p-channel FET on the high side 304) and the fourth transistor Q4 (being an n-channel FET on the low side 306) will be in an on state substantially allowing current to pass therethrough, whereas the second transistor Q2 (being a p-channel FET on the high side 304) and the third transistor Q3 (being an n-channel FET on the low side 306) will be in an off state substantially preventing current from passing therethrough. Therefore, current will flow through the LC circuit 205, and hence the induction element (not shown) in a first direction (left to right in the sense of FIG. 3b). However, at a second time, the driver controller 208 may be in a second switching state, where a potential of +v 202 is provided to the first supply connection 330, and a potential of GND 206 is provided to the second supply connection 332. Therefore, the gate terminals of the first and third transistors Q1, Q3 will have a potential of +v 202 applied thereto, and the gate terminals of the second and fourth transistors Q2, Q4 will have a potential of GND 206 applied thereto. Therefore, the first transistor Q1 and the fourth transistor Q4 will be in an off state substantially preventing current from passing therethrough, whereas the second transistor Q2 and the third transistor Q3 will be in an on state substantially allowing current to pass therethrough. Therefore, current will flow through the LC circuit 205, and hence the induction element (not shown) in a second direction (right to left in the sense of FIG. 3b) opposite to the first direction. By alternating between the first and second switching state therefore, the driver controller 208 may control the driver arrangement 204' to provide (i.e. drive) alternating current through the LC circuit 205 and hence through the induction element 108. In this example, since the driver controller 208 need only control two potentials, the controller 208 may employ simpler logic circuitry, therefore reducing the complexity and hence cost associated of the driver controller 208.

In either of the above first example driver arrangement 204 and the second example driver arrangement 204', the driver arrangement 204, 204' may comprise one or more half-bridge devices (not shown). For example, the driver arrangement may comprise a first half-bridge device comprising the first and third transistors Q1, Q3, and/or a second half-bridge device comprising the second and fourth transistors Q2, Q4. For example, the first half-bridge device (not shown) may comprise the first transistor Q1 (being a p-channel filed effect transistor, for example p-MOSFET) and the third transistor Q3 (being an n-channel field effect transistor, for example an n-MOSFET), and a first body (not shown), in which first and third transistors Q1, Q3 are provided. For example, the first body (not shown) may be of molded plastic or other suitable material in which the first and third Q1, Q3 transistors are incorporated. Similarly, the second half-bridge device (not shown) may comprise the second transistor Q2 (being a p-channel filed effect transistor, for example p-MOSFET) and the fourth transistor Q4 (being an n-channel field effect transistor, for example an n-MOSFET), and a second body (not shown), in which second and fourth transistors Q2, Q4 are provided. For example, the second body (not shown) may be of molded plastic or other suitable material in which the second and fourth transistors Q2, Q4 are incorporated. The first and/or the second half bridge device may be, for example, DMC1017UPD from Diodes Incorporated®.

As mentioned above, a p-MOSFET typically has a higher source-drain resistance than that of a n-MOSFET, and hence p-MOSFET may generate more heat in use than an n-MOSFET. This may affect the consistency of operation of the driver arrangement 204, 204'. However, a p-MOSFET and an n-MOSFET being provided in a half-bridge device comprising a body in which the two transistors are provided may allow for the excess heat to be distributed over the device, and hence allow for more consistent operation, and may help prevent the extent to which the p-MOSFET is heated up, and hence may improve efficiency. Further, a driver arrangement 204, 204' comprising first and second half bridge devices allows the heat generated by the p-MOSFETs of the H-bridge to be shared substantially equally between the first and second half-bridge devices. This may improve the consistency of operation of the driver arrangement 204, 204' and may help prevent the p-MOSFETs from heating up and hence may improve efficiency.

In the above examples, the driver arrangement 204, 204' the high side pair 304 of transistors Q1, Q2 were both p-channel field effect transistors, specifically p-MOSFETs and the low side pair of transistors Q3, Q4 were both n-channel field effect transistors, specifically n-MOSFETS. However, it will be appreciated that this need not necessarily be the case and in some examples at least one of the high side pair of transistors Q1, Q2 is a p-channel field effect transistor, and the other transistor Q1, Q2 of the high side pair may be other than a p-channel field effect transistor, and/or the one or both of the low side pair of field effect transistors Q3, Q4 may be other than n-channel field effect transistors. The at least one p-channel field effect transistor on the high side pair can be controlled using a switching potential between +v 202 and GND 206, and hence providing the switching potential by means other than the battery 104 is therefore not required, hence reducing the complexity and cost of the circuitry 106.

In the above examples, the driver arrangement 204, 204' comprised four transistors Q1, Q2, Q3, Q4 arranged in a H-bridge configuration but it will be appreciated that in other examples the driver arrangement 204, 204' may comprise further transistors, that may or may not be part of the H-bridge configuration.

Although in the above examples, the field effect transistors Q1, Q2, Q3, Q4 were depletion mode metal-oxide field effect transistors, it will be appreciated that this need not necessarily be the case and that in other examples other types of field effect transistors may be used.

The above examples are to be understood as illustrative examples of the disclosure. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

The invention claimed is:

1. Circuitry for an induction element for an aerosol generating device, the induction element being for inductive heating of a susceptor for heating an aerosol generating material in use, the circuitry comprising:
a driver arrangement arranged to provide, from an input direct current, an alternating current for driving the induction element in use, wherein the driver arrangement comprises a plurality of transistors arranged in an H-bridge configuration, wherein the H-bridge configuration comprises a high side pair of transistors and a low side pair of transistors, the high side pair of transistors being for connection to a first electric potential higher than a second electric potential to which the low side pair of transistors is for connection is use, wherein a first transistor of the high side pair of transistors is a p-channel field effect transistor, and a second transistor of the low side pair of transistors is an n-channel field effect transistor, the second transistor being electrically adjacent to the first transistor, and wherein the driver arrangement comprises a first half-bridge device comprising the first transistor, the second transistor, and a first body in which the first transistor and the second transistor are provided.

2. The circuitry according to claim 1, wherein both of the high side pair of transistors are p-channel field effect transistors.

3. The circuitry according to claim 1, wherein one or both of the low side pair of transistors are transistors other than p-channel field effect transistors.

4. The circuitry according to claim 1, wherein both of the low side pair of transistors are n-channel field effect transistors.

5. The circuitry according to claim 1, wherein the driver arrangement is arranged for connection of a DC power source in use across a first point between the high side pair of transistors and a second point between the low side pair of transistors.

6. The circuitry according to claim 1, wherein the driver arrangement is arranged for connection of the induction element in use across a third point between one of the high side pair of transistors and one of the low side pair of transistors and a fourth point between the other of the high side pair of transistors and the other of low side second pair of transistors.

7. The circuitry according to claim 1, wherein the at least one p-channel field effect transistor is controllable by a switching potential to substantially allow current to pass therethrough in use.

8. The circuitry according to claim 7, wherein the driving arrangement comprises a driver controller arranged to control supply of the switching potential to the at least one p-channel field effect transistor in use.

9. The circuitry according to claim 7, wherein the switching potential by which the p-channel field effect transistor is controllable in use is between the first potential and the second potential.

10. The circuitry according to claim 7, wherein the at least one p-channel field effect transistor is arranged such that, when the switching potential is provided to the p-channel field effect transistor then the p-channel field effect transistor substantially allows current to pass therethrough, and when the switching potential is not provided to the p-channel field effect transistor then the p-channel field effect transistor substantially prevents current from passing therethrough.

11. The circuitry according to claim 7, wherein the at least one p-channel field effect transistor comprises a source, a drain, and a gate, and wherein in use the switching potential is provided to the gate of the at least one p-channel field effect transistor.

12. The circuitry according to claim 7, wherein the at least one p-channel field effect transistor is a p-channel metal-oxide-semiconductor field effect transistor.

13. The circuitry according to claim 1, wherein the driver arrangement comprises a first supply connection arranged to supply a switching potential in common to both of the first transistor and the second transistor.

14. The circuitry according to claim 1, wherein a third transistor of the high side pair of transistors is a p-channel filed effect transistor and a fourth transistor of the low side pair of transistors is an n-channel field effect transistor, the fourth transistor being electrically adjacent to the third transistor.

15. The circuitry according to claim 14, wherein the driver arrangement comprises a second supply connection arranged to supply a switching potential in common to both of the third transistor and the fourth transistor.

16. The circuitry according to claim 15, wherein the driver arrangement comprises a first supply connection arranged to supply a switching potential in common to both of the first transistor and the second transistor, and wherein the circuitry comprises a driver controller, the driver controller being arranged to control supply of the switching potential alternately to the first supply connection and the second supply connection, thereby to provide the alternating current in use.

17. The circuitry according to claim 14, wherein the driver arrangement comprises a second half-bridge device comprising:
the third transistor;
the fourth transistor; and
a second body in which the third transistor and the fourth transistor are provided.

18. The circuitry according to claim 1, wherein the driver arrangement is arranged for connection to a DC power source to provide the input direct current in use.

19. The circuitry according to claim 18, wherein the at least one p-channel field effect transistor is controllable by a switching potential to substantially allow current to pass therethrough in use, and wherein the driver arrangement is configured for connection to the DC power source to provide the switching potential in use.

20. An aerosol generating device comprising:
circuitry for an induction element of the aerosol generating device, the induction element being for inductive heating of a susceptor for heating an aerosol generating material in use, the circuitry comprising:
a driver arrangement arranged to provide, from an input direct current, an alternating current for driving the induction element in use, wherein the driver arrangement comprises a plurality of transistors arranged in an H-bridge configuration, wherein the H-bridge configuration comprises a high side pair of transistors and a low side pair of transistors, the high side pair of transistors being for connection to a first electric potential higher than a second electric potential to which the low side pair of transistors is for connection is use, wherein a first transistor of the high side pair of transistors is a p-channel field effect transistor, and a second transistor of the low side pair of transistors is an n-channel field effect transistor, the second transistor being electrically adjacent to the first transistor, and wherein the driver arrangement comprises a first half-bridge device comprising the first transistor, the second transistor, and a first body in which the first transistor and the second transistor are provided.

21. The aerosol generating device according to claim 20, the aerosol generating device further comprising:
a DC power source, the DC power source being arranged to provide at least one of the input direct current in use or the or a switching potential in use.

22. The aerosol generating device according to claim 20, the aerosol generating device further comprising:
the induction element, wherein the driver arrangement is arranged to provide alternating current to the induction element in use.

23. The aerosol generating device according to claim 22, wherein the aerosol generating device comprises an LC circuit comprising the induction element, and wherein, in use, the alternating current is provided to the LC circuit.

24. The aerosol generating device according to claim 22, the aerosol generating device further comprising:
the susceptor, wherein the susceptor is arranged to be inductively heated by the induction element in use.

25. The aerosol generating device according to claim 24, wherein the device further comprises:
the aerosol generating material, wherein the aerosol generating material is arranged to be heated by the susceptor thereby to generate an aerosol in use.

26. The aerosol generating device according to claim 25, wherein the aerosol generating material is or comprises tobacco.

\* \* \* \* \*